United States Patent
Fabre et al.

(10) Patent No.: US 11,398,321 B2
(45) Date of Patent: Jul. 26, 2022

(54) METHODS FOR DIELECTRICALLY INSULATING ELECTRICAL ACTIVE PARTS

(71) Applicant: SOLVAY SA, Brussels (BE)

(72) Inventors: Jean Fabre, Wettbergen (DE); Ferdinand Hardinghaus, Bad Honnef (DE); Holger Pernice, Schwanewede (DE); Sebastian Hasenstab-Riedel, Kleinmachnow (DE); Helmut Beckers, Görlitz (DE); Simon Steinhauer, Berlin (DE); Jan Hendrick Nissen, Berlin (DE)

(73) Assignee: Solvay SA, Brussels (BE)

( * ) Notice: Subject to any disclaimer, the term of this patent is extended or adjusted under 35 U.S.C. 154(b) by 334 days.

(21) Appl. No.: 16/095,756

(22) PCT Filed: May 3, 2017

(86) PCT No.: PCT/EP2017/060555
§ 371 (c)(1),
(2) Date: Oct. 23, 2018

(87) PCT Pub. No.: WO2017/191198
PCT Pub. Date: Nov. 9, 2017

(65) Prior Publication Data
US 2020/0335239 A1   Oct. 22, 2020

(30) Foreign Application Priority Data
May 4, 2016 (EP) .................................. 16168250

(51) Int. Cl.
*H01B 3/56* (2006.01)

(52) U.S. Cl.
CPC ...................................... *H01B 3/56* (2013.01)

(58) Field of Classification Search
CPC ........................................................ H01B 3/56
See application file for complete search history.

(56) References Cited

U.S. PATENT DOCUMENTS

| 4,275,260 A * | 6/1981 | Wootton | H01B 3/56 |
| | | | 174/17 GF |
| 4,533,776 A * | 8/1985 | Baasner | C07C 201/14 |
| | | | 568/936 |
| 2008/0135817 A1* | 6/2008 | Luly | H01B 3/56 |
| | | | 252/571 |
| 2020/0335239 A1* | 10/2020 | Fabre | H01B 3/56 |

FOREIGN PATENT DOCUMENTS

| DE | 3305201 A1 * | 8/1984 | ........... C07C 205/10 |
| GB | 770 619 A | 3/1957 | |
| GB | 770619 A * | 3/1957 | ........... C07C 201/00 |
| GB | 770619 A * | 3/1975 | ............... H01B 3/56 |
| GB | 1 540 131 A | 2/1979 | |
| GB | 1540131 A * | 2/1979 | ............. H01B 3/465 |

* cited by examiner

*Primary Examiner* — Nicole M. Buie-Hatcher
*Assistant Examiner* — M. Reza Asdjodi
(74) *Attorney, Agent, or Firm* — Osha Bergman Watanabe & Burton LLP

(57) ABSTRACT

The invention concerns methods for dielectrically insulating electrical active parts using certain fluorinated nitroalkanes, as well as compositions and apparatus comprising such compounds.

16 Claims, No Drawings

METHODS FOR DIELECTRICALLY INSULATING ELECTRICAL ACTIVE PARTS

This application is a U.S. national phase entry under 35 U.S.C. § 371 of International Application No. PCT/EP2017/060555, filed on May 3, 2017, which claims priority to European Application No. 16168250.5, filed on May 4, 2016. The entire contents of these applications are explicitly incorporated herein by this reference.

The invention concerns methods for dielectrically insulating electrical active parts using certain fluorinated nitroalkanes, as well as compositions and apparatus comprising such compounds.

Dielectrically insulation media in liquid or gaseous state are applied for the insulation of electrical active parts in a wide variety of electrical apparatus, e.g. in switchgears or transformers.

Mixtures of $SF_6$ and $N_2$ are widely applied as dielectrically insulating medium. Efforts have been made in the past to provide alternative dielectrically insulating media.

WO 2014/096414 concerns a method of dielectrically insulating electrical active parts using certain fluorinated compounds, e.g. fluorinated ethers and peroxides.

The object of the present invention is to provide improved methods and/or compositions for the electrical insulation of electrical active parts.

Advantageously, the methods and compositions of the present invention show improved insulation, arc-extinguishing and/or switching performance. Also advantageously, the methods and compositions of the present invention show advantageous environmental impact when the insulating medium is released into the atmosphere, e.g. as measured by an improved global warming potential (GWP) and/or improved ozone depletion. Also advantageously, the methods and compositions of the present invention show an improved toxicological behavior, as measured for example by a higher LC50 and/or a higher Occupational Exposure Limit. Furthermore, the methods and compositions advantageously show an improved dew point, vapour pressure, boiling point, dielectrical strengths, and/or thermal stability of the insulating media. Additionally, the compositions according to this invention advantageously show an improved chemical inertness against the construction materials used e.g. for the electrical active parts and/or improved heat transfer properties.

These and other objectives are solved by the present invention as outlined in the claims.

Accordingly, a first aspect of the present invention concerns a method for dielectrically insulating an electrical active part wherein the electrical active part is arranged in a gas-tight housing comprising an insulating medium consisting of, consisting essentially of, or comprising a compound of general formula (I): $R^1R^2R^3C-NO_2$, wherein $R^1$ and $R^2$ are independently hydrogen, fluorine, alkyl, alkenyl, alkynyl, aryl, fluorosubstituted alkyl, fluorosubstituted alkenyl, fluorosubstituted alkynyl or fluorosubstituted aryl and $R^3$ is hydrogen, alkyl, alkenyl, alkynyl, aryl, fluorosubstituted alkyl, fluorosubstituted alkenyl, fluorosubstituted alkynyl or fluorosubstituted aryl. Preferably, $R^1$ is fluorine. Also preferably, $R^3$ is $CF_3$. Also preferably, $R^2$ is $CF_3$ or F. Specifically, the compound is $CF_3CF_2-NO_2$ or $(CF_3)_2CF-NO_2$.

The term "fluorosubstituted" is intended to denote a group wherein at least one hydrogen atom is replaced by one fluorine atom.

The term "aryl" is intended to denote a monovalent radical derived from an aromatic nucleus such as, in particular, a C6-C10 aromatic nucleus, in particular phenyl or naphthyl. The aryl group can optionally be substituted, e.g. substituted with at least one alkyl group.

The term "alkyl" is intended to denote an optionally substituted saturated monovalent hydrocarbon radical, such as, in particular, a C1-C6 alkyl. By way of example, mention may be made of methyl, ethyl, propyl, isopropyl, butyl, t-butyl, pentyl, isopentyl and hexyl. The alkyl may be optionally substituted, e.g. with halogen, aryl, or heteroaryl. A preferred alkyl group is methyl. The term "alkyl" also encompasses cycloalkyl groups. Cycloalkyl groups are optionally substituted cycles of saturated hydrocarbon-based groups. By way of example, mention may be made of cyclopropyl, cyclobutyl, cyclopentyl, and cyclohexyl.

The term "alkenyl" is intended to denote a straight or branched acyclic monovalent hydrocarbon radical having one or more carbon-carbon double bonds of either E or Z stereochemistry where applicable. The term includes, for example, vinyl, allyl, 1-butenyl, 2-butenyl, and 2-methyl-2-propenyl.

The term "alkynyl" is intended to denote a straight or branched chain monovalent hydrocarbon radical having from two to six carbon atoms and at least one carbon-carbon triple bond and optionally one or more carbon-carbon double bonds. Examples include ethynyl, propynyl and 3,4-pentadiene-1-ynyl.

The term "consisting essentially of" as used herein is intended to denote a composition comprising the components as specified as well as other components in trace amounts wherein the presence of the other components does not change the essential characteristics of the specified subject matter.

Preferably, fluorosubstituted alkyl is a perfluorinated alkyl. Hence, all hydrogen atoms in the fluorosubstituted alkyl have been replaced by fluorine atoms. Thus, fluorosubstituted alkyl can be chosen from the group consisting of perfluorinated methyl, ethyl, isopropyl, n-propyl, isobutyl, n-butyl or tert-butyl, n-pentyl or isopentyl groups, most preferably, chosen from trifluoromethyl, pentafluoroethyl, and heptafluoroisopropyl, specifically $CF_3$.

Preferably, the concentration of the compound of general formula (I) in the insulating medium is at least 1 vol %, more preferably at least 2.5 vol %, most preferably at least 5 vol %. If mixtures of the compound of general formula (I) and other components are used, advantageously the concentration is equal to or lower than 95 vol %, more preferably 85 vol %, most preferably 75 vol %.

In the frame of the present invention, the singular is intended to include the plural, and vice versa.

Another aspect of the present invention concerns a method for dielectrically insulating an electrical active part wherein the electrical active part is arranged in a gas-tight housing comprising an insulating medium consisting of, consisting essentially of, or comprising a compound of general formula (II): $R^1R^2R^3C-NO$, wherein $R^1$ is hydrogen, fluorine, alkyl, alkenyl, alkynyl, aryl, fluorosubstituted alkyl, fluorosubstituted alkenyl, fluorosubstituted alkynyl or fluorosubstituted aryl and $R^2$ and $R^3$ are independently hydrogen, alkyl, alkenyl, alkynyl, aryl, fluorosubstituted alkyl, fluorosubstituted alkenyl, fluorosubstituted alkynyl or fluorosubstituted aryl. Preferably, $R^1$ is fluorine. Also preferably, $R^2$ or $R^3$ are $CF_3$. Also preferably, $R^2$ and $R^3$ are $CF_3$. Specifically, the compound is $(CF_3)_2CF-NO$.

Compounds according to this invention can be obtained commercially or prepared as described in S. Andreades, Journal of Organic Chemistry, 1962 (27), pages 4157-4162, S. Andreades, Journal of Organic Chemistry, 1962 (27), pages 4163-4170 and/or DE 3305201A1. Alternatively, $(CF_3)_2CF—NO_2$ can be prepared in a reaction of hexafluoropropene with $FNO_2$.

Another aspect of the invention is a method to prepare the inventive nitroso compounds in a substitution reaction of the corresponding halogen derivatives with NO. For example, $(CF_3)_2CF—NO$ can be prepared by a reaction of $(CF_3)_2CF—I$ with NO. Preferably, this reaction will be performed in absence of a solvent at a temperature under which the reactants are present in gaseous form. Also preferably, the reaction is performed under irradiation, more preferably under irradiation by means of a xenon high pressure UV lamp.

Another aspect of the invention is a method to prepare the inventive nitro compounds in a substitution reaction of the corresponding halogen derivatives with $NO_2$. For example, $(CF_3)_2CF—NO_2$ can be prepared by a reaction of $(CF_3)_2CF—I$ with $NO_2$. Preferably, this reaction will be performed in absence of a solvent at a temperature under which the reactants are present in gaseous form. Also preferably, the reaction is performed under irradiation, more preferably under irradiation by means of a xenon high pressure UV lamp.

Furthermore, the nitro compounds can be prepared by oxidation of the corresponding nitroso compounds. Suitable oxidating agents include hydrogen peroxide, especially in form of a hydrogen peroxide:urea (1:1) adduct, oxygen and ozone as well as mixtures thereof. For example, $(CF_3)_2CF—NO_2$ can be prepared by a reaction of $(CF_3)_2CF—NO$ with a mixture of oxygen and ozone. Preferably, the reaction is performed in the absence of a solvent. Also preferably, it is performed in the presence of a solvent. A preferred solvent is dichloromethane.

Advantageously, the reaction is performed in the presence of a solid absorber for the reactants and/or the reagents. Examples of suitable solid absorbers include silica gel, aluminium oxide, cerium oxide, zeolites and combinations thereof. Especially preferred is silica gel.

Preferably, the insulating medium used in the inventive method comprises the compound of formula (I) or (II) and at least one further compound selected from the list consisting of an inert gas, a perfluorinated or partially fluorinated ketone, a perfluorinated or partially fluorinated ether, a perfluorinated or partially fluorinated dialkylperoxide, a perfluorinated or partially fluorinated ester, a perfluorinated or partially fluorinated cyano compound and a hydrocarbon compound. More preferably, the at least one compound is an inert gas selected from the group consisting of air, synthetic air, an air component, $N_2$, $O_2$, $CO_2$, $N_2O$, He, Ne, Ar, Xe and $SF_6$; preferably the at least one compound is $N_2$.

Preferably, the concentration of the compound of general formula (I) or (II) in the composition is at least 1 vol %, more preferably at least 2.5 vol %, most preferably at least 5 vol %. If mixtures of the compound of general formula (I) and other components are used, advantageously the concentration is equal to or lower than 95 vol %, more preferably 85 vol %, most preferably 75 vol %.

The term "inert gas" is intended to denote a gas that does not react with the compounds according to the invention. Preferably, the inert gas is chosen from the list consisting of air, synthetic air, an air component, $N_2$, $O_2$, $CO_2$, $N_2O$, He, Ne, Ar, Xe or $SF_6$; more preferably, the inert gas is $N_2$.

Preferably, the at least one compound is a perfluorinated or partially fluorinated ketone. The term "ketone" is intended to denote a compound incorporating at least one carbonyl group with two carbon atoms attached to the carbon of the carbonyl group. It shall encompass saturated compounds and unsaturated compounds including double and/or triple bonds. The at least partially fluorinated alkyl chain of the ketones can be linear or branched. The term "ketone" shall also encompass compounds with a cyclic carbon backbone. The term "ketone" may comprise additional in-chain hetero-atoms, e.g. at least one heteroatom being part of the carbon backbone and/or being attached to the carbon backbone. More preferably, the at least one compound is a perfluorinated ketone. Examples of suitable perfluorinated ketones include 1,1,1,3,4,4,4-heptafluoro-3-(trifluoromethyl)-butan-2-one; 1,1,1,3,3,4,4,5,5,5-decafluoropentan-2-one; 1,1,1,2,2,4,4,5,5,5-decafluoropentan-3-one, 1,1,1,4,4,5,5,5-octafluoro-3-bis-(trifluoromethyl)-pentan-2-one; and most preferably heptafluoroisopropyl-trifluoromethyl-ketone.

Also preferably, the at least one compound is a perfluorinated or partially fluorinated ether. The term "ether" is intended to denote a compound incorporating at least one "—C—O—C—" moiety. Especially suitable examples include pentafluoro-ethyl-methyl ether and 2,2,2-trifluoroethyl-trifluoromethyl ether.

Also preferably, the at least one compound is a perfluorinated or partially fluorinated dialkylperoxide. The term "dialkylperoxide" is intended to denote a compound incorporating at least one "—C—O—O—C—" moiety. Especially suitable examples include pentafluoro-ethyl-methyl peroxide and bis-pentafluoro-ethyl-peroxide.

Also preferably, the at least one compound is a perfluorinated or partially fluorinated ester, i.e. a compound incorporating at least one "—C(O)O—" moiety. Suitable compounds are known in the art, especially suitable examples include methyl, ethyl, and trifluoromethyl esters of trifluoroacetic acid.

Also preferably, the at least one compound is a perfluorinated or partially fluorinated cyano compound, i.e. a compound incorporating at least one moiety of the structure "—C≡N". Preferably, the cyano compound is perfluorinated, more preferably the cyano compound is chosen from the list consisting of perfluorinated methyl, ethyl, isopropyl, propyl, butyl, isobutyl and tertbutyl nitrile.

Also preferably, the at least one compound is a perfluorinated or partially fluorinated hydrocarbon compound. "Hydrocarbon compound" is intended to denote a saturated or unsaturated hydrocarbon, which may in addition to the fluoro substitution also be substituted by other halogen atoms, e.g. Cl, Br, and/or I. Suitable examples include $CHF_3$, $C_2F_4$, $CF_3CF_2CF_2CF_2I$, and $CF_2Cl_2$.

The term "electrical active part" has to be understood very broadly. Preferably, it covers any part which is used for the generation, the distribution or the usage of electrical energy provided it comprises a gas-tight housing wherein the dielectrically insulating medium provides for the dielectrically insulation of parts which bear voltage and/or current.

Preferably, the electrical active parts are medium voltage or high voltage parts. The term "medium voltage" relates to a voltage in the range of 1 kV to 72 kV; the term "high voltage" refers to a voltage of more than 72 kV. While these are preferred electrical active parts in the frame of the present invention, the parts may also be low voltage parts with a voltage below 1 kV being concerned.

It has to be noted that the electrical active parts of the invention can be "stand alone" parts, or they can be part of an assembly of parts, e.g. of an apparatus. This will now be explained in detail.

The electrical active part can be a switch, for example, a fast acting earthing switch, a disconnector, a load-break switch or a puffer circuit breaker, in particular a medium-voltage circuit breaker (GIS-MV), a generator circuit breaker (GIS-HV), a high voltage circuit breaker, a bus bar a bushing, a gas-insulated cable, a gas-insulated transmission line, a cable joint, a current transformer, a voltage transformer or a surge arrester.

The electrical active part may also be part of an electrical rotating machine, a generator, a motor, a drive, a semiconducting device, a computing machine, a power electronics device or high frequency parts, for example, antennas or ignition coils.

The method of the invention is especially suited for medium voltage switchgears and high voltage switchgears.

The insulating medium used in the method of the invention is preferably in the gaseous state when used in the method of the invention. However, depending on the conditions, e.g. the temperature and the pressure, under which the method is performed, the insulating medium can also be, at least partially, in the liquid or in the supercritical state.

In the electrical active part, the insulating medium is preferably at a pressure of equal to or greater than 0.1 bar (abs.). The insulating medium is preferably at a pressure equal to or lowers than 30 bar (abs). A preferred pressure range is from 1 to 20 bar (abs.).

The partial pressure of the compound of general structure (I) in the gaseous phase depends, i.a. upon its concentration in the insulating medium. If the dielectrically insulating medium consists of the compound of general structure (I) or (II) its partial pressure is equal to the total pressure and corresponds to the ranges given above. If the medium includes an inert gas, the partial pressure of the compound of general structure (I) is correspondingly lower. A partial pressure of the compound of general structure (I) or (II) which is equal to or lower than 10 bar (abs) is preferred.

It is also preferred that the compound or the mixture, respectively, is such that under the climate conditions or the temperature in the ambience of the electrical apparatus, under the pressure in the electrical part, essentially no condensation of the components in the dielectrically insulating medium occurs. The term "essentially no condensation" denotes that at most 5% by weight, preferably at most 2% by weight, of the dielectrically insulating medium condenses. For example, the amounts of compound of formula (I) the kind and amount of inert gas are selected such that the partial pressure of compound of formula (I) is lower than the pressure where condensation of compound of formula (I) is observed at −20° C.

In a second aspect, the present invention concerns a composition consisting of, consisting essentially of, or comprising at least one compound of general formula (I): $R^1R^2R^3C-NO_2$, wherein $R^1$ and $R^2$ are independently hydrogen, fluorine, alkyl, alkenyl, alkynyl, aryl, fluorosubstituted alkyl, fluorosubstituted alkenyl, fluorosubstituted alkynyl or fluorosubstituted aryl and $R^3$ is hydrogen, alkyl, alkenyl, alkynyl, aryl, fluorosubstituted alkyl, fluorosubstituted alkenyl, fluorosubstituted alkynyl or fluorosubstituted aryl, or a compound of general structure (II); and at least one further compound selected from the group consisting of an inert gas, a perfluorinated or partially fluorinated ketone, a perfluorinated or partially fluorinated ether, a perfluorinated or partially fluorinated dialkylperoxide, a perfluorinated or partially fluorinated ester, a perfluorinated or partially fluorinated cyano compound and a hydrocarbon compound.

Preferably, the concentration of the compound of general formula (I) or (II) in the composition is at least 1 vol %.

Preferably, the composition consists of, consists essentially of, or comprises $CF_3CF_2-NO_2$, $(CF_3)_2CF-NO_2$, or $CF_3CF_2-NO$ and at least one compound selected from the group consisting of an inert gas, a perfluorinated or partially fluorinated ketone, a perfluorinated or partially fluorinated ether, a perfluorinated or partially fluorinated dialkylperoxide, a perfluorinated or partially fluorinated ester, a perfluorinated or partially fluorinated cyano compound and a hydrocarbon compound.

More preferably, the composition consists of, consists essentially of, or comprises $CF_3CF_2-NO_2$ or $(CF_3)_2CF-NO_2$ and at least one compound selected from the group consisting of air, synthetic air, an air component, $N_2$, $O_2$, $CO_2$, $N_2O$, He, Ne, Ar, Xe or $SF_6$; preferably consisting of, consisting essentially of, or comprising $CF_3CF_2-NO_2$ or $(CF_3)_2CF-NO_2$ and $N_2$.

In a third object, the present invention concerns an apparatus for the generation, distribution and/or usage of electrical energy wherein the apparatus comprises an electrical active part arranged in a gas-tight housing and said gas-tight housing containing an insulating medium comprising, consisting essentially of, or consisting of at least one compound of general formula (I): $R^1R^2R^3C-NO_2$, wherein $R^1$ and $R^2$ are independently hydrogen, fluorine, alkyl, alkenyl, alkynyl, aryl, fluorosubstituted alkyl, fluorosubstituted alkenyl, fluorosubstituted alkynyl or fluorosubstituted aryl and $R^3$ is hydrogen, alkyl, alkenyl, alkynyl, aryl, fluorosubstituted alkyl, fluorosubstituted alkenyl, fluorosubstituted alkynyl or fluorosubstituted aryl, or a compound of general structure (II); or containing an insulating medium consisting of, consisting essentially of, or comprising the inventive composition as defined above. Preferably, the insulating medium consists of, consists essentially of, or comprises $CF_3CF_2-NO_2$ or $(CF_3)_2CF-NO_2$. Also preferably, the apparatus is a medium-voltage or high-voltage switchgear.

Another object of the present invention concerns the use of the compounds or the mixtures of this invention, as herein described, as dielectrically insulating medium or as constituent of a dielectrically insulating medium as well as their use as an dry etching agent, e.g. a chamber cleaning agent, specifically, for plasma-enhanced chamber cleaning as a replacement for $NF_3$.

Another object of the present invention is the use of the compounds of general formula (I) as replacements for fluorocarbons or hydrofluorocarbons as blowing agents in the manufacture of closed-cell polyurethane, phenolic and thermoplastic foams, as propellants in aerosols, as heat transfer media, as fire extinguishing agents, as power cycle working fluids such as for heat pumps, as inert media for polymerization reactions, as fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewellery or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

Another object of the present invention is the use of a compound of general formula (I): $R^1R^2R^3C-NO_2$, wherein $R^1$ and $R^2$ are independently hydrogen, fluorine, alkyl, alkenyl, alkynyl, aryl, fluorosubstituted alkyl, fluorosubstituted alkenyl, fluorosubstituted alkynyl or fluorosubstituted aryl and $R^3$ is hydrogen, alkyl, alkenyl, alkynyl, aryl, fluorosubstituted alkyl, fluorosubstituted alkenyl, fluorosubstituted alkynyl or fluorosubstituted aryl, or a compound of general structure (II) as a dielectric medium to insulate an electrical active part. The preferred electrical active part can be a switch, for example, a fast acting earthing switch, a disconnector, a load-break switch or a puffer circuit breaker, in particular a medium-voltage circuit breaker (GIS-MV), a generator circuit breaker (GIS-HV), a high voltage circuit breaker, a bus bar a bushing, a gas-insulated cable, a gas-insulated transmission line, a cable joint, a current transformer, a voltage transformer or a surge arrester.

Should the disclosure of any patents, patent applications, and publications which are incorporated herein by reference conflict with the description of the present application to the extent that it may render a term unclear, the present description shall take precedence.

The following examples further explain the invention without intention to limit it.

EXAMPLES

Example 1a: Manufacture of $(CF_3)_2CF$—$NO_2$ $(CF_3)_2CF$—$NO_2$ is prepared according to DE 3305201A1 (example 11).

Example 1b: Manufacture of the Compositions

As described in WO98/23363, a homogenous mixture consisting $(CF_3)_2CF$—$NO_2$ and $N_2$ in a volume ratio 1:4 is manufactured in an apparatus comprising a static mixer and a compressor.

Example 1c: Manufacture of $(CF_3)_2CF$—$NO$

In an evacuated 500 ml Duran® bulb with Young®-valve 2.96 g (10 mmol) $(CF_3)_2CF$—I and 0.33 g (11 mmol) NO were condensed by means of cooling with liquid nitrogen. The bulb was allowed to warm to 20° C. and placed in a water bath. The bulb was irradiated with the unfiltered light of a 1000 W xenon high pressure UV-lamp from above for 1 h. During this time the cooling water was allowed to reach 50° C.

The content of the bulb was purified by repeated trap-to-trap distillation. The isolated yield was 87% (1.73 g) of the theoretical yield.

Example 1c: Manufacture of $(CF_3)_2CF$—$NO_2$

In a Duran® reaction vessel equipped with a dip pipe with valve and a release valve at the top (conventional cooling trap), 100 g of silica gel (2 mm to 5 mm transparent silica gel (Merck, CAS: 7631-86-9) was placed. The vessel was evacuated and dried. 1.18 g $(CF_3)_2CF$—NO was introduced by means of the dip pipe and was absorbed on the silica gel pearls turning their colour to light blue. Subsequently, a $O_2$ flow of 100 ml/min containing 11 mol % $O_3$ was introduced through the dip pipe into the reaction vessel at room temperature for 30 minutes. A U-shaped cooling trap with bypass and Fomblin® oil filled bubble-meter was attached to the outlet of the vessel. The cooling trap was cooled to −123° C. to allow the $O_3/O_2$ mixture to leave the system. The reaction vessel was evacuated at room temperature to remove any unreacted absorbed ozone. Afterwards, 560 mg colourless $(CF_3)_2CF$—$NO_2$ was released by evacuating the reaction vessel at a temperature of 60° C.

Example 1d: Manufacture of $C_2F_5NO$

A 4000 ml Duran® bulb vessel with Young®-valve was evacuated and 19.7 g (80 mmol) $C_2F_5I$ and 2.4 g (80 mmol) NO were condensed into the vessel by means of cooling with liquid nitrogen. The vessel was allowed to warm to 20° C. and placed into a water bath. The vessel was irradiated with the unfiltered light of a 1000 W xenon high pressure UV-lamp for 6 hours. During the irradiation the water bath was allowed to warm to 50° C. The content of the vessel was purified by isothermal destillation at −60° C. in a pressure range of 1.12 to 0.92 bar (absolute). The isolated yield was 67% (8.02 g) of the theoretical yield in form of a blue gas.

Example 1e: Manufacture of $C_2F_5NO_2$

In an evacuated 500 ml Duran® bulb with Young®-valve 7 times mixtures of $C_2F_5I$ and $NO_2/N_2O_4$ (1:1 in pressure, total pressures ranging from 266 mbar to 940 mbar each) were introduced. In total, 7.12 g (29.43 mmol) $C_2F_5I$ was used. Each mixture was irradiated for 1 hour by the unfiltered light of a 1000 W high pressure Xe UV lamp in a water-filled cooling bath. During this time the cooling water was allowed to reach 50° C. The seven raw product fractions were combined and purified by repeated trap-to-trap distillation through a series of cooling traps kept at −196° C., −158° C., and −115° C. The fraction in the −158° C. trap was purified by further trap-to-trap distillations resulting in 1.27 g (7.7 mmol) $C_2F_5NO_2$ (26,16% of the theoretical yield).

Example 1f: Manufacture of $(CF_3)_2CF$—$NO_2$

In a 100 mL Duran® bulb with Young®-valve 0.23 g (2.44 mmol) $H_2O_2$:urea (1:1 adduct, CAS: 124-43-6) and a magnetic PTFE jacketed magnet were placed and cooled to −196° C. Then, the vessel was evacuated. 0.49 g (2.44 mmol) $(CF_3)_2CF$—NO and 0.47 g (5.5 mmol) dichloromethane were condensed into the bulb. The bulb was heated to 60° C. for 1 hour while the content was stirred. IR spectroscopy showed that 57% of $(CF_3)_2CF$—NO had been converted $(CF_3)_2CF$—$NO_2$.

Example 2: Provision of an Earth Cable Containing the Dielectrically Insulating Medium of Example 1

The composition of example 1b is directly fed into an earth cable for high voltage, until a total pressure of 10 bar (abs) is achieved in the cable.

Example 3: A Switchgear Containing $(CF_3)_2CF$—$NO_2$ and $N_2$ in a Volume Ratio 1:4

A switchgear is used which contains a switch surrounded by a gas-tight metal case. The composition of example 1b is passed into the gas tight metal case via a valve until a pressure of 18 bar (abs) is achieved.

The invention claimed is:

1. A composition comprising at least one compound of general formula (I)

$$R^1R^2R^3C\text{—}NO_2 \qquad (I)$$

wherein $R^1$ and $R^2$ are independently hydrogen, fluorine, alkyl, alkenyl, alkynyl, aryl, fluorosubstituted alkyl, fluorosubstituted alkenyl, fluorosubstituted alkynyl or fluorosubstituted aryl and R3 is hydrogen, alkyl, alkenyl, alkynyl, aryl, fluorosubstituted alkyl, fluorosubstituted alkenyl, fluorosubstituted alkynyl or fluorosubstituted aryl; and at least one further compound selected from the group consisting of an inert gas, a perfluorinated or partially fluorinated ketone, a perfluorinated or partially fluorinated ether, a perfluorinated or partially fluorinated dialkylperoxide, a perfluorinated or partially fluorinated ester, a perfluorinated or partially fluorinated cyano compound and a hydrocarbon compound.

2. The composition according to claim 1 comprising $CF_3$—$CF_2$—$NO_2$ and/or $(CF_3)_2CF$—$NO_2$ and at least one compound selected from the group consisting of an inert gas, a perfluorinated or partially fluorinated ketone, a perfluorinated or partially fluorinated ether, a perfluorinated or partially fluorinated dialkylperoxide, a perfluorinated or partially fluorinated ester, a perfluorinated or partially fluorinated cyano compound and a hydrocarbon compound.

3. The composition of claim 2 comprising $CF_3$—$CF_2$—$NO_2$ and/or $(CF_3)_2CF$—$NO_2$ and at least one compound selected from the group consisting of air, synthetic air, an air component, $N_2$, $O_2$, $CO_2$, $N_2O$, He, Ne, Ar, Xe or $SF_6$.

4. A composition according to claim 1, wherein the concentration of the compound of general formula (I) in the composition is at least 1 vol %.

5. The composition of claim 3 comprising $CF_3$—$CF_2$—$NO_2$ and/or $(CF_3)_2CF$—$NO_2$ and $N_2$.

6. A method for dielectrically insulating an electrical active part, the method comprising arranging the electrical active part in a gas-tight housing comprising an insulating medium comprising the composition according to claim 1.

7. The method according to claim 6 wherein $R^1$ is fluorine.

8. The method according to claim 6 wherein $R^3$ is $CF_3$.

9. The method according to claim 6, wherein $R^2$ is $CF_3$ or F.

10. The method according to claim 6 wherein the compound is $CF_3$-$CF_2$-$NO_2$ or $(CF_3)_2CF$-$NO_2$.

11. The method according to claim 6 wherein the concentration of the compound of general formula (I) in the insulating medium is at least 1 vol %.

12. The method according to claim 11 wherein the concentration of the compound of general formula (I) in the insulating medium is at least 2.5 vol %.

13. The method according to claim 12 wherein the concentration of the compound of general formula (I) in the insulating medium is at least 5 vol %.

14. An apparatus for the generation, distribution and/or usage of electrical energy wherein the apparatus comprises an electrical active part arranged in a gas-tight housing, said gas-tight housing containing an insulating medium comprising the composition according to claim 1.

15. The apparatus of claim 14 wherein the insulating medium comprises $CF_3$-$CF_2$-$NO_2$ and/or $(CF_3)_2CF$-$NO_2$.

16. The apparatus of claim 14 wherein the concentration of the compound of general formula (I) in the insulating medium is at least 1 vol %.

* * * * *